(12) United States Patent
Villarreal

(10) Patent No.: US 11,518,425 B2
(45) Date of Patent: Dec. 6, 2022

(54) STROLLER HANDLE DEVICE

(71) Applicant: Stroller Arms, LLC, Houston, TX (US)

(72) Inventor: Daniela Villarreal, Houston, TX (US)

(73) Assignee: Stroller Arms, LLC, Houston, TX (US)

( * ) Notice: Subject to any disclaimer, the term of this patent is extended or adjusted under 35 U.S.C. 154(b) by 357 days.

(21) Appl. No.: 16/649,063

(22) PCT Filed: Sep. 28, 2018

(86) PCT No.: PCT/US2018/053504
§ 371 (c)(1),
(2) Date: Mar. 19, 2020

(87) PCT Pub. No.: WO2019/067949
PCT Pub. Date: Apr. 4, 2019

(65) Prior Publication Data
US 2020/0262463 A1 Aug. 20, 2020

Related U.S. Application Data

(60) Provisional application No. 62/565,757, filed on Sep. 29, 2017.

(51) Int. Cl.
*B62B 9/20* (2006.01)
*A63B 21/012* (2006.01)
*A63B 21/00* (2006.01)

(52) U.S. Cl.
CPC ............ *B62B 9/206* (2013.01); *A63B 21/012* (2013.01); *A63B 21/4033* (2015.10); *B62B 9/20* (2013.01)

(58) Field of Classification Search
CPC ....... B62B 9/206; B62B 9/20; A63B 21/4033; A63B 21/4027; A63B 21/40; A63B 21/012
See application file for complete search history.

(56) References Cited

U.S. PATENT DOCUMENTS 4,625,963 A * 12/1986 Lancellotti ....... A63B 23/03533
482/130
5,674,165 A 10/1997 Cohen et al.
(Continued)

OTHER PUBLICATIONS

Notification of transmittal of the International Search Report and the Written Opinion of the International Searching Authority, or the Declaration, PCT application No. PCT/US18/53504 dated Dec. 14, 2018, 9 pages.

*Primary Examiner* — John D Walters

(57) ABSTRACT

A stroller handle adaptor having a first handle assembly rotationally coupled to the first end of a shaft having a shaft axis, the first handle assembly further comprising a first cylindrical housing having a first axis with a first handle protruding tangentially therefrom, wherein the first handle rotates about the first axis and the first axis is offset from the shaft axis, a second handle assembly rotationally coupled to the second end of the shaft, the second handle assembly further comprising a second cylindrical housing having a second axis with a second handle protruding tangentially therefrom, wherein the second handle rotates about the second axis and the second axis is offset from the shaft axis, wherein the stroller handles assembly is adapted to couple to an existing stroller handle.

35 Claims, 12 Drawing Sheets

(56) References Cited

U.S. PATENT DOCUMENTS

| | | | |
|---|---|---|---|
| 6,098,492 | A | 8/2000 | Juchniewicz et al. |
| 6,196,947 | B1 | 3/2001 | Anderson |
| 8,012,070 | B2 * | 9/2011 | James .............. A63B 21/00069 |
| | | | 482/904 |
| 8,172,243 | B2 | 5/2012 | Dresher |
| 9,144,708 | B2 * | 9/2015 | Selek .................... A63B 23/16 |
| 2008/0100014 | A1 | 5/2008 | Tripiano |
| 2013/0143719 | A1 | 6/2013 | Selek |
| 2015/0069738 | A1 | 3/2015 | Knight et al. |

* cited by examiner

STROLLER HANDLE DEVICE

RELATED APPLICATIONS

This application claims priority to U.S. Provisional Application No. 62/565,757, filed Sep. 29, 2017.

BACKGROUND OF THE INVENTION

Generally, current stroller do not allow for ergonomic running strides of users by preventing a user's arms from moving in a natural running motion while controlling the stroller. This disclosure provides alternatives for equipment that allows a natural running arm movement when using traditional fixed-handle strollers.

SUMMARY OF EXAMPLE EMBODIMENTS

An example embodiment may include a mounting bar, rotational resistance systems, and clamps for attaching the device to a stroller handle. An example embodiment includes a stroller handle assembly having a first handle assembly rotationally coupled to the first end of a shaft having a shaft axis, the first handle assembly further comprising a first cylindrical housing having a first axis with a first handle protruding tangentially therefrom, wherein the first handle rotates about the first axis and the first axis is offset from the shaft axis, a second handle assembly rotationally coupled to the second end of the shaft, the second handle assembly further comprising a second cylindrical housing having a second axis with a second handle protruding tangentially therefrom, wherein the second handle rotates about the second axis and the second axis is offset from the shaft axis, in which the stroller handles assembly is adapted to couple to an existing stroller handle.

A variation of the example embodiment may include a first cylindrical collet with a cylindrical hollow opening disposed within the first cylindrical housing. It may include a second cylindrical collet with a cylindrical hollow opening disposed within the second cylindrical housing. It may include a first adaptor disposed within the hollow opening of the first collet. It may include a second adaptor disposed within the hollow opening of the second collet. It may include a first collet shaft disposed within the first housing and coupled to the first housing and further coupled to the shaft. It may include a second collet shaft disposed within the second housing and coupled to the second housing and further coupled to the shaft. It may include a first collet knob coupled to the first collet, wherein the first collet knob threads into the first housing and provides the compression on the first collet, thereby controlling the rotational friction within the first handle assembly. It may include a second collet knob coupled to the second collet, wherein the second collet knob threads into the second housing and provides the compression on the second collet, thereby controlling the rotational friction within the second handle assembly.

A variation of the example embodiment may include the first collet being a tapered cylinder. The second collet may be a tapered cylinder. The first collet may have a tangential gap. The second collet may have a tangential gap. The first adaptor may be a tapered cylinder. The second adaptor may be a tapered cylinder. It may include a first stroller clamp coupled to the shaft, proximate to the first handle assembly, wherein the first stroller clamp is adapted to couple to a stroller. The first stroller clamp may have a first jaw and a second jaw, each of the first and second jaw having three faces opposing those faces on the other jaw to describe a hexagonal shape between the jaws. It may include a second stroller clamp coupled to the shaft, proximate to the second handle assembly, wherein the first stroller clamp is adapted to couple to a stroller. The first stroller clamp may have a first jaw and a second jaw, each of the first and second jaw having three faces opposing those faces on the other jaw to describe a hexagonal shape between the jaws.

An example embodiment may include a stroller handle apparatus having a mounting bar 501 having a telescoping length adjustment, a first clamp mounted proximate a first end of the mounting bar adapted to clamp to a bar perpendicular to the mounting bar a second clamp mounted proximate a second end of the mounting bar adapted to clamp to a bar perpendicular to the mounting bar, a first rotational resistance body mounted to the first end of the mounting bar and being substantially cylindrical about a rotational axis, a first inner collet having a conical outer surface and cylindrical inner surface about the rotational axis, a first outer collet having a conical inner surface about the rotational axis fitting against the outer surface of the first inner collet, a first tension knob threaded into the first rotational housing along an adjustment axis parallel to but offset from the rotational axis, wherein rotation of the first tension knob adjusts frictional forces between the first inner collet and first outer collet, a first handle housing having a substantially cylindrical inner surface about the rotational axis, a first handle mounted at a first end to the first handle housing, a second rotational resistance body mounted to the second end of the mounting bar and being substantially cylindrical about a second rotational axis, a second inner collet having a conical outer surface and cylindrical inner surface about the second rotational axis, a second outer collet having a conical inner surface about the second rotational axis fitting against the outer surface of the second inner collet, a second tension knob threaded into the second rotational housing along a second adjustment axis parallel to but offset from the second rotational axis, wherein rotation of the second tension knob adjusts frictional forces between the second inner collet and second outer collet, a second handle housing having a substantially cylindrical inner surface about the second rotational axis, and a second handle mounted at a first end to the second handle housing.

A variation of the example embodiment may include the rotation of handle about first rotational axis being resisted by friction between inner collet, outer collet, and handle housing. The rotation of handle about first rotational axis may be resisted by friction between first inner collet, first outer collet, first handle housing, and first rotational resistance body. The first and second rotational axis may be the same. The first rotational resistance body may include a shoulder abutting an inner end of the first inner collet and the second rotational resistance body having a shoulder abutting an inner end of the second inner collet. The first and second handle housing may have a first and second handle socket and for receiving the first end of handles and, respectively. It may include a first detent adapted to engage one or more sockets on handle to allow selective rotation of handle in handle socket. The first outer collet may include a circumferential outer groove adapted to provide clearance between the outer circumference of first outer collet and first tension knob. The first inner collet may include a radial slot to allow the circumference of inner surface to decrease under compressive load. The reduction of the circumference of inner surface may increase rotational friction between inner collet and rotational resistance body. The first outer collet may include a radial slot to allow the circumference of outer surface to increase under expansive load. The increase of the circumference of outer surface may increase rotational friction between first outer collet and first handle housing.

An example embodiment may include the first clamp having a first jaw having a central inner surface perpendicular to axis of rotation and angled inner surfaces at an angle between 5 and 85 degrees of central inner surface. It may have a second jaw having a central inner surface perpendicular to axis of rotation and angled inner surfaces at an angle between 5 and 85 degrees of central inner surface. It may include a first clamp having a cam lock for urging second jaw toward first jaw. It may include the first clamp having screw for urging second jaw toward first jaw. The first handle housing may have a substantially cylindrical inner surface engaging outer surface of first outer collet.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1A:
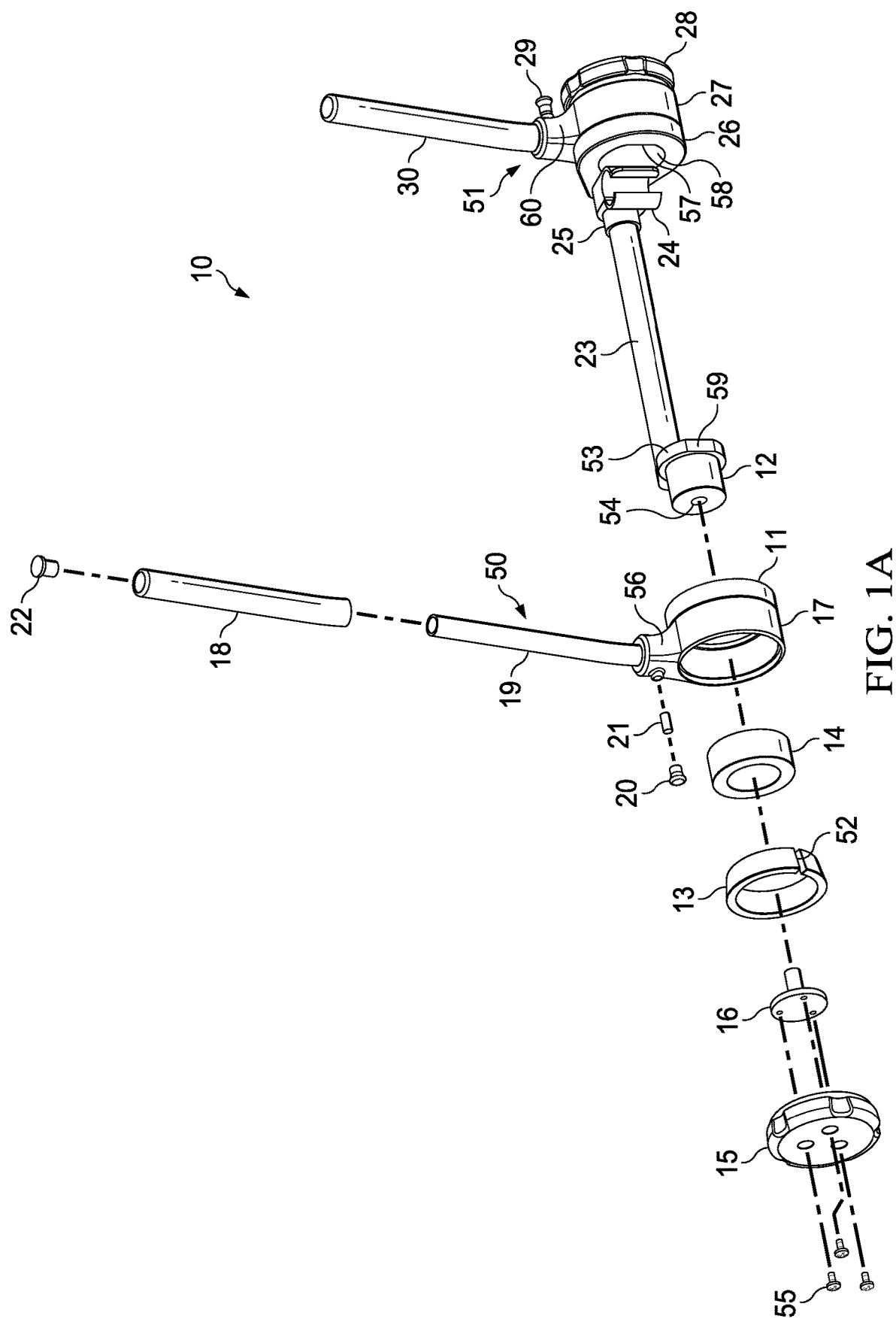
FIG. 1A shows an assembly of an example embodiment.

An example embodiment is shown in FIG. 1A. A stroller handle assembly 10 has a first handle portion 50 and a second handle portion 51. First handle portion 50 is depicted in an exploded view and includes a circular housing 17 with a collet 13 disposed therein. The collet 13 is a tapered hollow cylindrical having a gap 52. A hollow circular adaptor 14 is positioned within the hollow portion of collet 13. Collet shaft 12 is positioned within the hollow portion of adaptor 14. Collet shaft 12 has a collet head 53 that engages with the collet housing 11 and stops against the adaptor 14. Collet housing 11 may be coupled with the housing 17. Collet head 53 has flat portions 59 to prevent the collet head 53 from rotating within the collet housing 11. Collet thread adaptor 16 threads into the threaded inner hole 54 of collet shaft 12. Collet knob 15 threads into the housing 17.

Collet shaft 12 is located off-centered from shaft 23 via a shaft clamp adaptor and provides an offset between the axis of the shaft 23 and the axis of the collet 13. The handle 19 is positioned into a receptor portion 56 of housing 17. Handle 19 is locked into place via a combination of push/pull knob 20 coupled to the retractable pin 21 within the receptor portion 56. A grip 18 is slideably engaged about the handle 19. A tube plug 22 is coupled to the distal end of grip 18. Collet shaft 12 has an inner threaded hole 54.

Second handle portion 51 is depicted in an assembled view and it mirrors the first handle portion 50. It includes a circular housing 27 with a collet disposed therein similar to collet 13. A hollow circular adaptor is positioned within the hollow portion of collet. A Collet shaft is positioned within the hollow portion of adaptor. Collet shaft has a collet head 57 that stops against the adaptor and uses flat portions 58 to prevent rotation within the collet housing 26. The collet housing 26 may be coupled with the housing 27. A Collet thread adaptor threads into the threaded inner hole of a collet shaft. Collet knob 28 threads into the housing 27.

Collet head 57 and its associated collet shaft is located off-centered from shaft 23 via a shaft clamp adaptor 25 and provides an offset between the axis of the shaft 23 and the axis of the collet within the housing 27. The handle and grip combination 30 is positioned into a receptor portion 60 of housing 27. Handle 30 is locked into place via a combination of push/pull knob 29 coupled to the retractable pin within the receptor portion 60. A tube plug is coupled to the distal end of the handle 30. Clamp 24 attaches to a stroller handle.

Figure 1B:
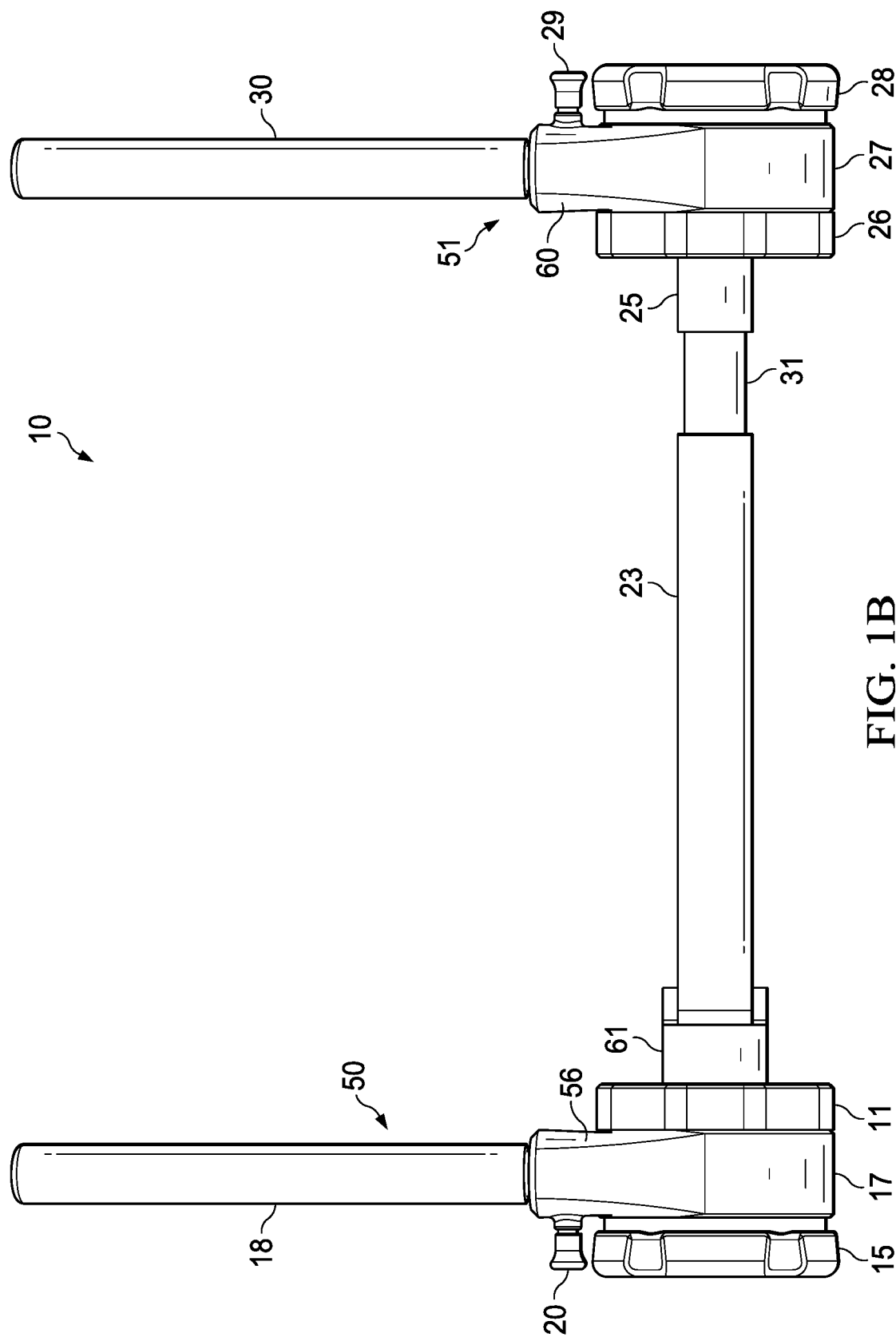
FIG. 1B shows a profile view of an example embodiment.

An example embodiment is shown in FIG. 1B. The stroller handle assembly 10 is shown with both the first handle portion 50 and second handle portion 51 fully assembled. Collet knob 15 is threaded into the housing 17. Collet knob 28 is threaded into the housing 27. Shaft clamp adaptor 25 is coupled to both the shaft 23 and the collet housing 26. Shaft clamp adaptor 61 is coupled to shaft 23 and the collet housing 11. Shaft 23 is shown having a shaft extension 31, allowing the stroller handle assembly 10 to adjust its overall width to accommodate a wide variety of stroller sizes. Grip 18 and its underlying handle are coupled to the receptor portion 56 and held in place via push/pull knob 20. Grip 30 and its underlying handle are coupled to the receptor portion 60 and held in place via push/pull knob 29.

Figure 1C:
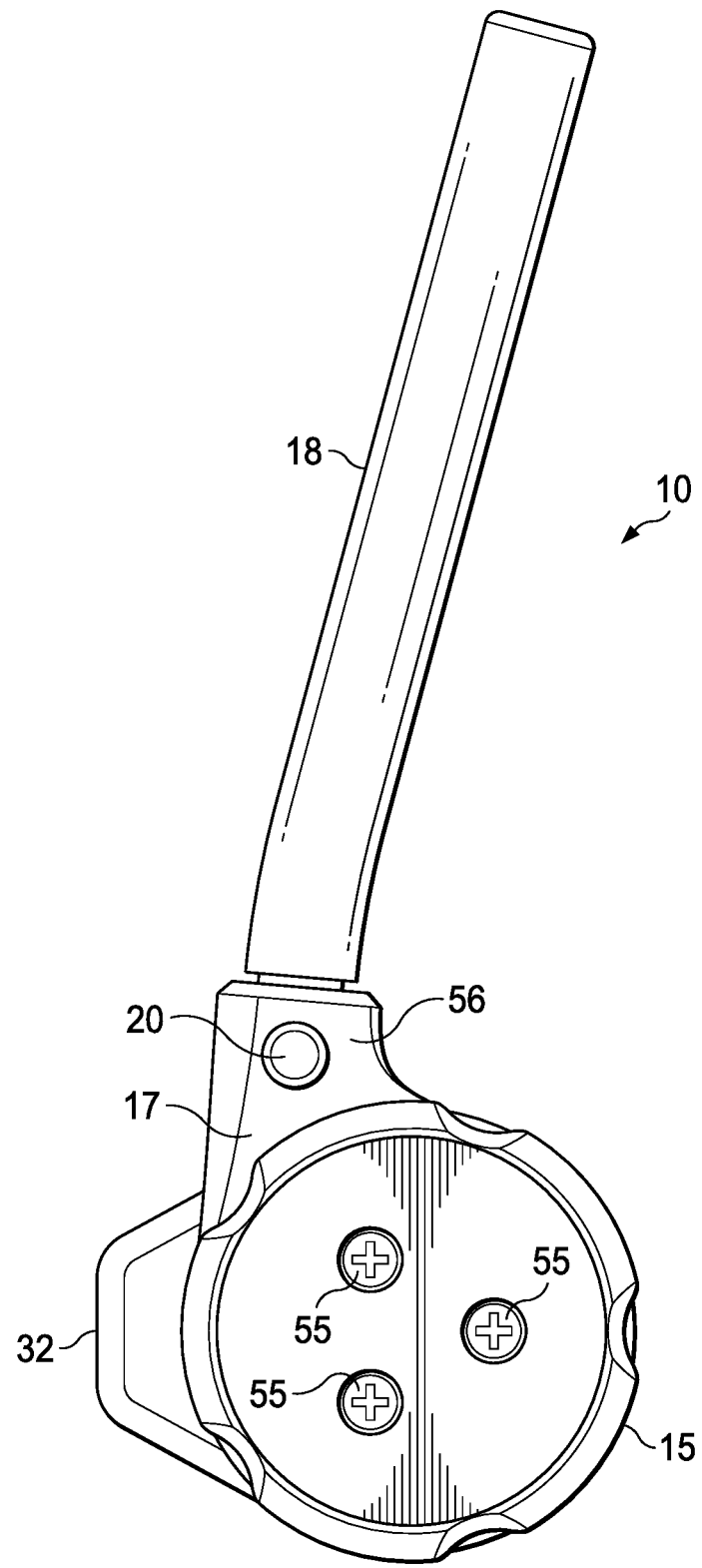
FIG. 1C shows a profile view of an example embodiment.

A side profile of the assembly stroller handle assembly 10 is shown in FIG. 1C. Grip 18 is coupled to housing 17 through the receptor portion 56 and is held in place by push/pull knob 20. Collet knob 15 is coupled to the housing 17 via fasteners 55. Support 32 may be integral to the housing 17.

Figure 2A:
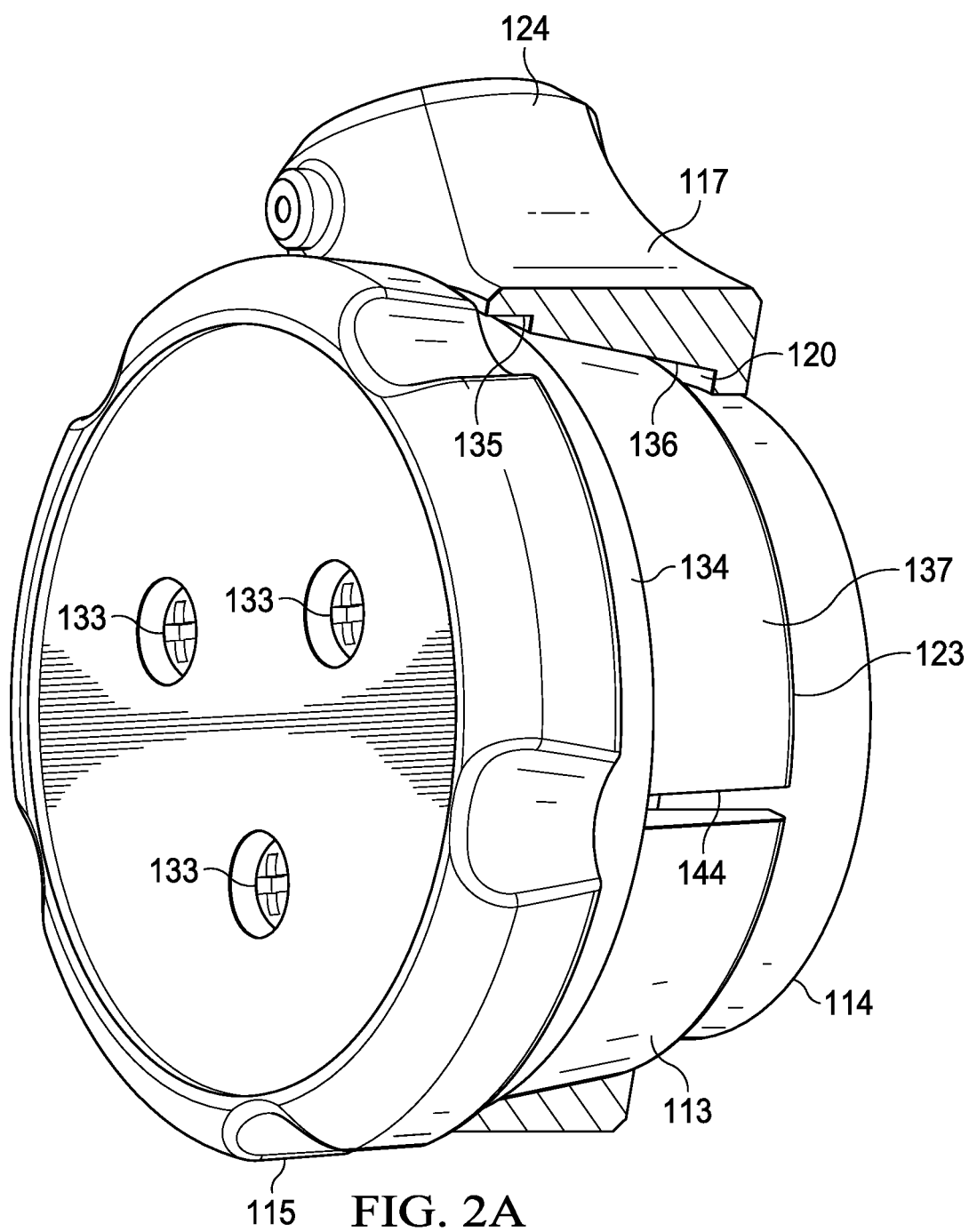
FIG. 2A shows a perspective view of an example embodiment.

A cutaway view of a housing with the collet installed is shown in FIG. 2A. A housing 117 contains a cylinder tapered collet 113 with a gap 144 to allow for an adjustable fit over adaptor 114. The collet knob 115 is held in place via fasteners 133 against the housing 117. The housing 117 has an inner tapered surface 136 to interface with the outer tapered surface 137 of the collet 113. The inner surface 120 provides a backstop for the collet 113. A multitude of friction surfaces are created by this design wherein there is friction between the outer tapered surface 137 and inner tapered surface 136, interaction with the inside of the collet 113 with the adaptor 114, and interaction with the outer edge of the collet 123 with the inner surface 120. As the collet 113 is tightened down into the housing 117, via collet knob 115, the overall friction between the friction surfaces adjust how much force is required to rotate the handles about the collet housing, thus providing an adjustable resistance during exercise. A cutout 135 allows the cylindrical surfaced portion 134 of collet knob 115 to slideably engage with the housing 117. Receptor portion 124 attaches to a handle with a grip.

Figure 2B:
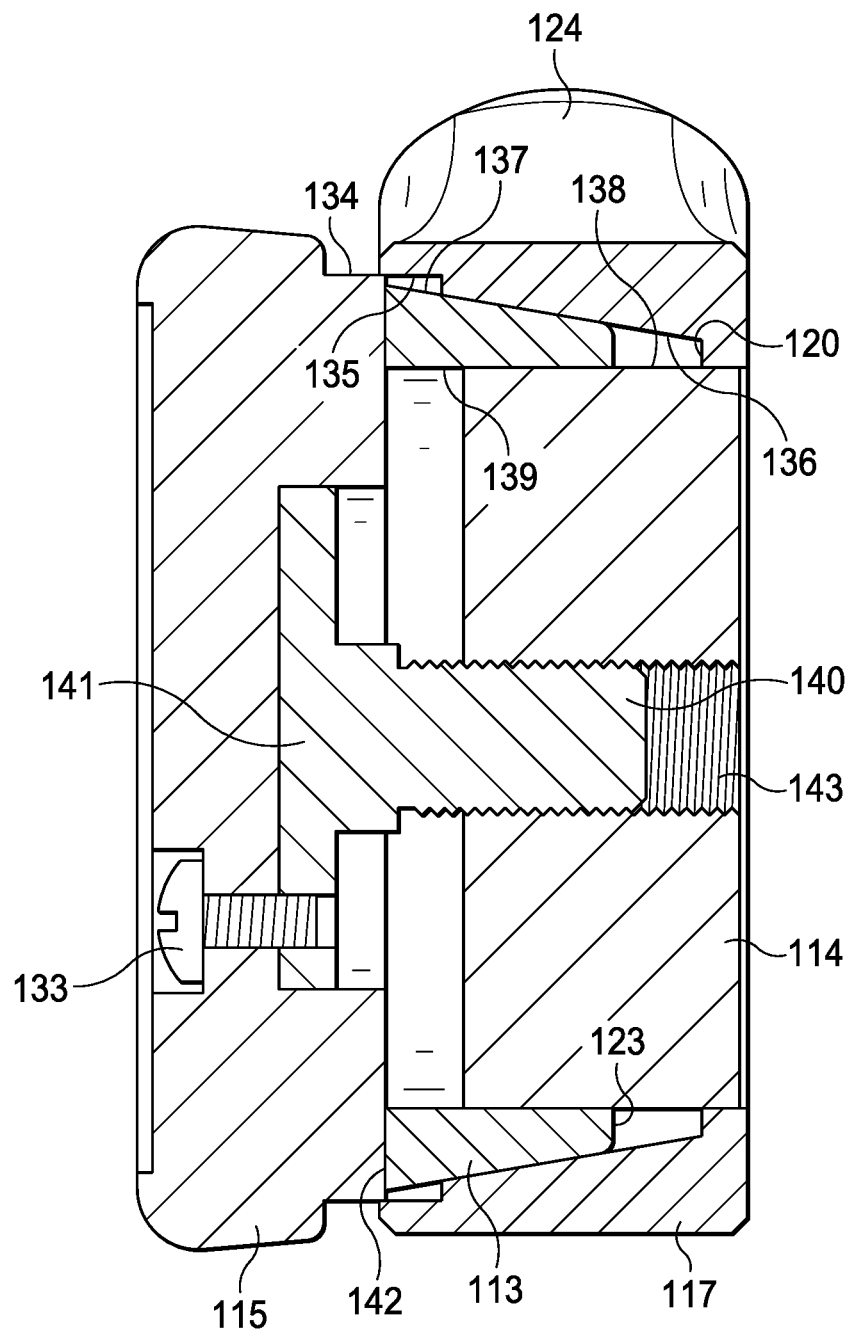
FIG. 2B shows cross section view of an example embodiment.

A cutaway side view of a housing with the collet installed is shown in FIG. 2B. The housing 117 contains a cylinder tapered collet 113 with a gap to allow for an adjustable fit over adaptor 114. The collet knob 115 is held in place via fasteners 133 coupled into collet thread 141. Collet thread 141 with threads 140 is threaded into adaptor 114 threaded thru hole 143. The housing 117 has an inner tapered surface 136 to interface with the outer tapered surface 137 of the collet 113. The inner surface 120 provides a backstop for the collet 113. A multitude of friction surfaces are created by this design wherein there is friction between the collet surface 137 and inner tapered surface 136, interaction with the inside of the collet 113 along inner surface 139 with the adaptor 114, and interaction with the outer edge of the collet 123 with the inner surface 120. As the collet 113 is tightened down into the housing 117, via collet knob 115, the overall friction between the friction surfaces adjust how much force is required to rotate the handles about the collet housing, thus providing an adjustable resistance during exercise. Collet knob 115 is secured to the collet thread 141 via fasteners 133.

Figure 3:
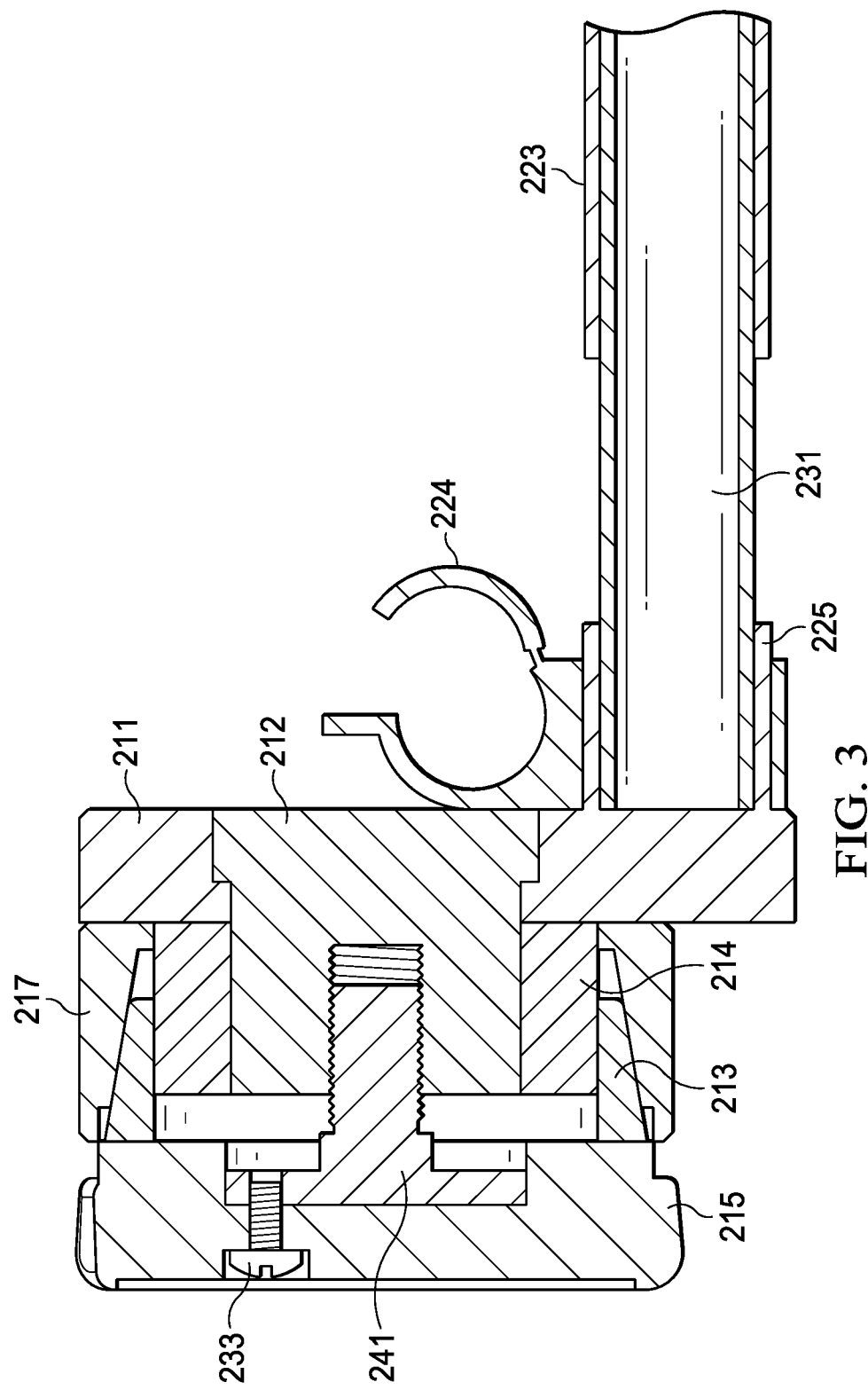
FIG. 3 shows a cross section view of an example embodiment.

FIG. 3 shows a top cross section view of an example embodiment of an assembly stroller handle section. The fastener 233 holds the collet knob 215 against the collet 213 via the coupling of collet thread 241 into the collet shaft 212. The collet 213 is frictionally engaged to the housing 217 and the adaptor 214, which in turn rotates frictionally in relation to the collet housing 211. The collet housing 211 is coupled to shaft clamp adaptor 225. The shaft clamp adaptor 225 has a clamp 224 for mounting the stroller handle onto a stroller. The shaft clamp adaptor 225 is further coupled to a shaft 223 with an inner shaft extension 231 to allow for a variable length for mounting to different types of strollers.

Figure 4:
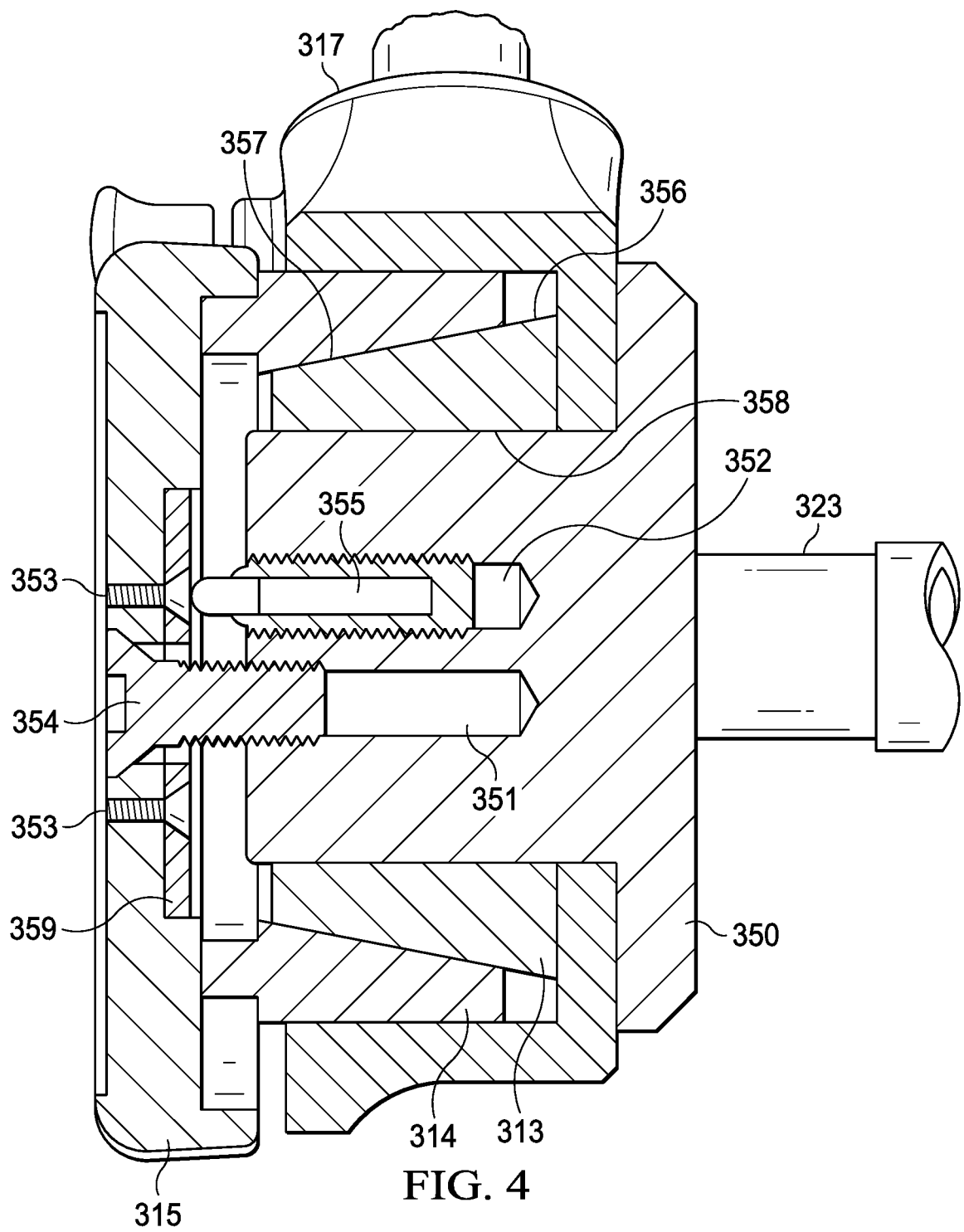
FIG. 4 shows a cross section view of an example embodiment.

FIG. 4 shows a cross section view of an example embodiment of an assembly stroller handle section. The housing 317 contains a tapered collet 314 frictionally engaged to a tapered adaptor 313. The inner housing 317 is not tapered in this example embodiment. The tapered surface 356 of the adaptor 313 and the tapered surface 357 of the collet 314 provide the progressive friction as the collet is loaded against the adaptor. The force against the collet 314 is provided by the collet knob 315 coupled to the collet shaft 350 and held in place by fastener 354 threaded into bore 351. A retractable pin 355 is located in bore 352. Shaft 323 is located off-centered from the axis of rotation, which is about fastener 354. Screws 353 couple the disk 359 into the collet knob 315. Cylindrical surface 358 of the collet shaft 350 engages frictionally with the adaptor 313.

Figure 5:
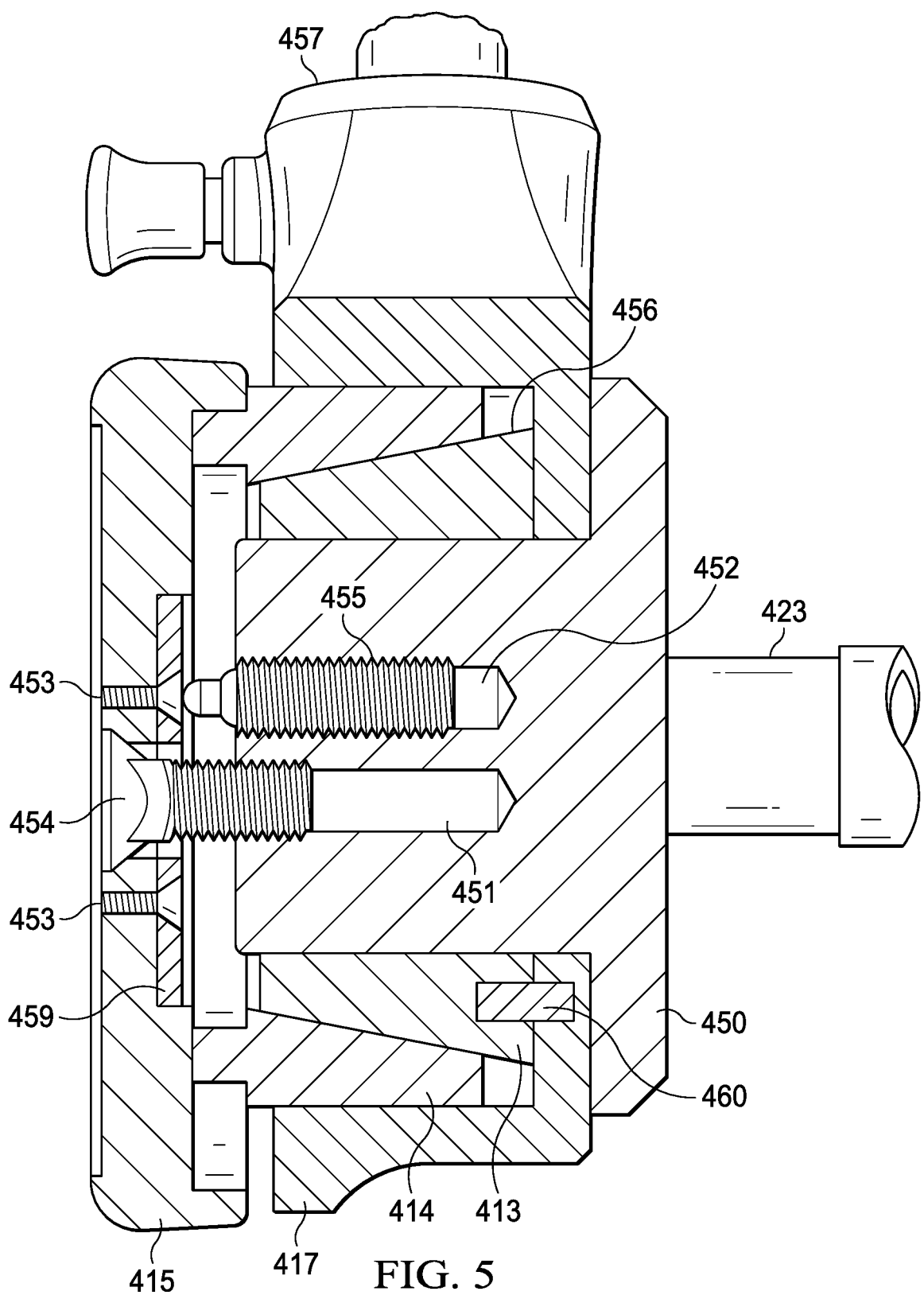
FIG. 5 shows a cross section view of an example embodiment.
Figure 6:
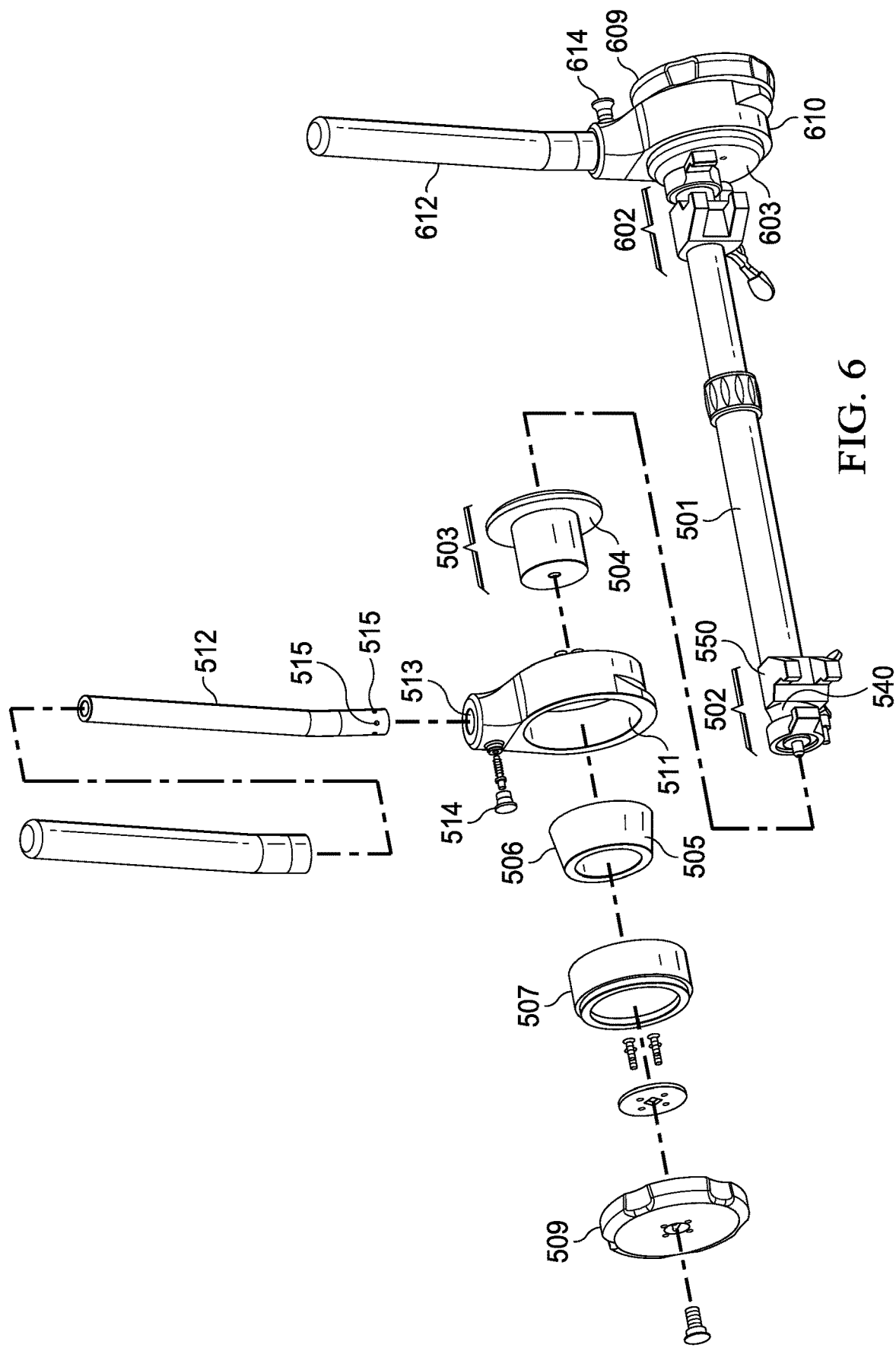
FIG. 6 shows a partially exploded view of an example embodiment.
Figure 7:
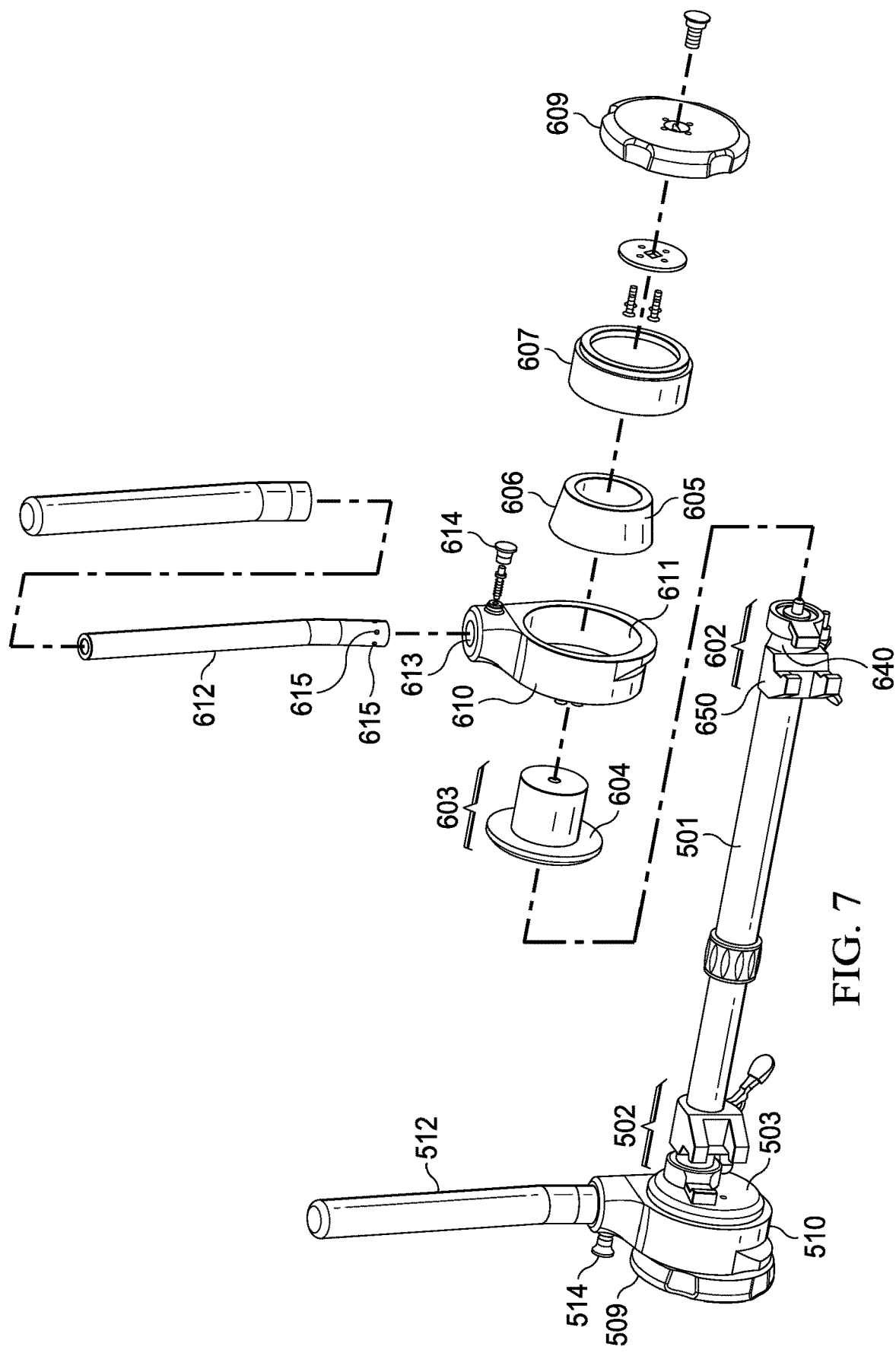
FIG. 7 shows a partially exploded view of an example embodiment.
Figure 8:
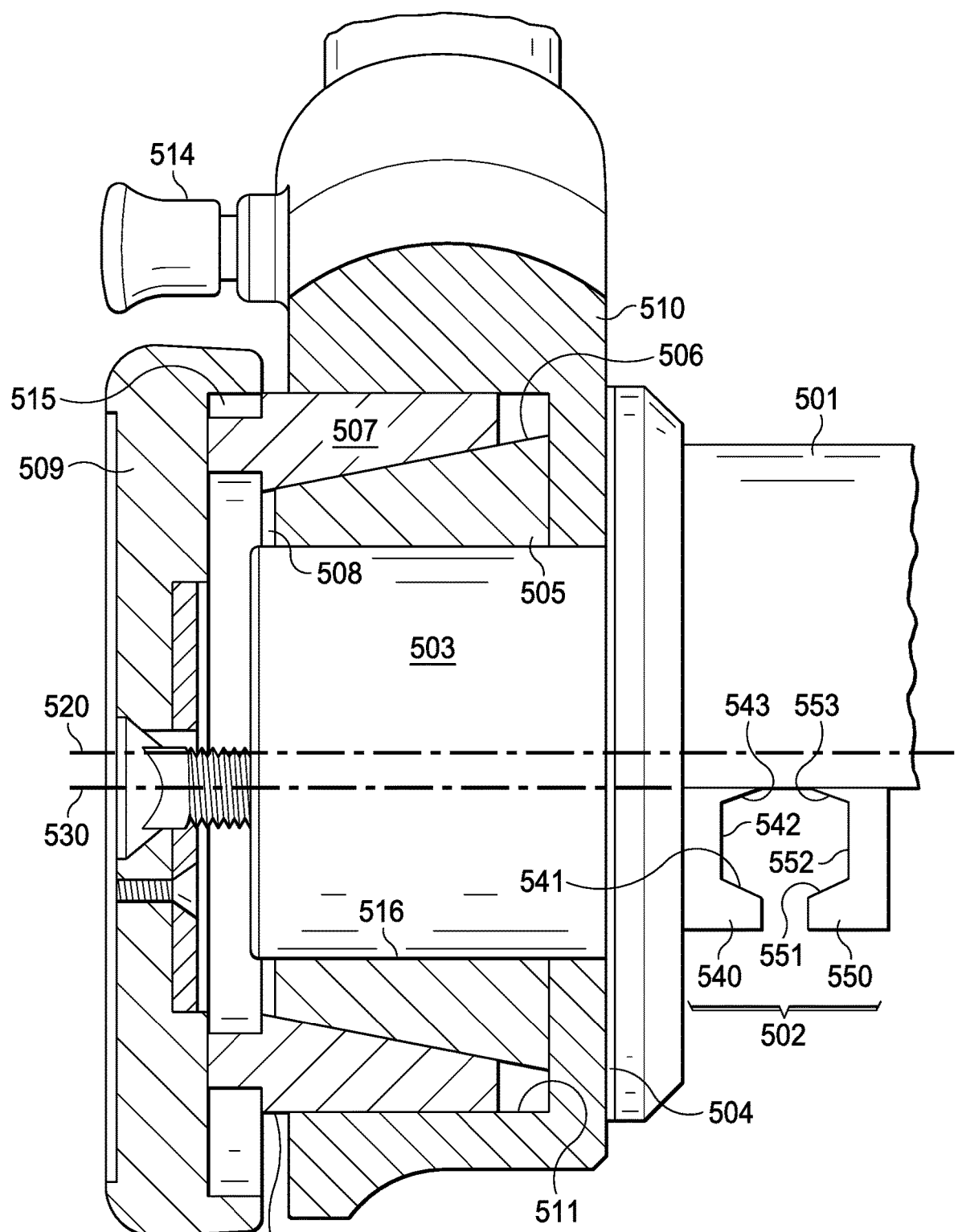
FIG. 8 shows a partial cross-section view of an example embodiment.
Figure 9:
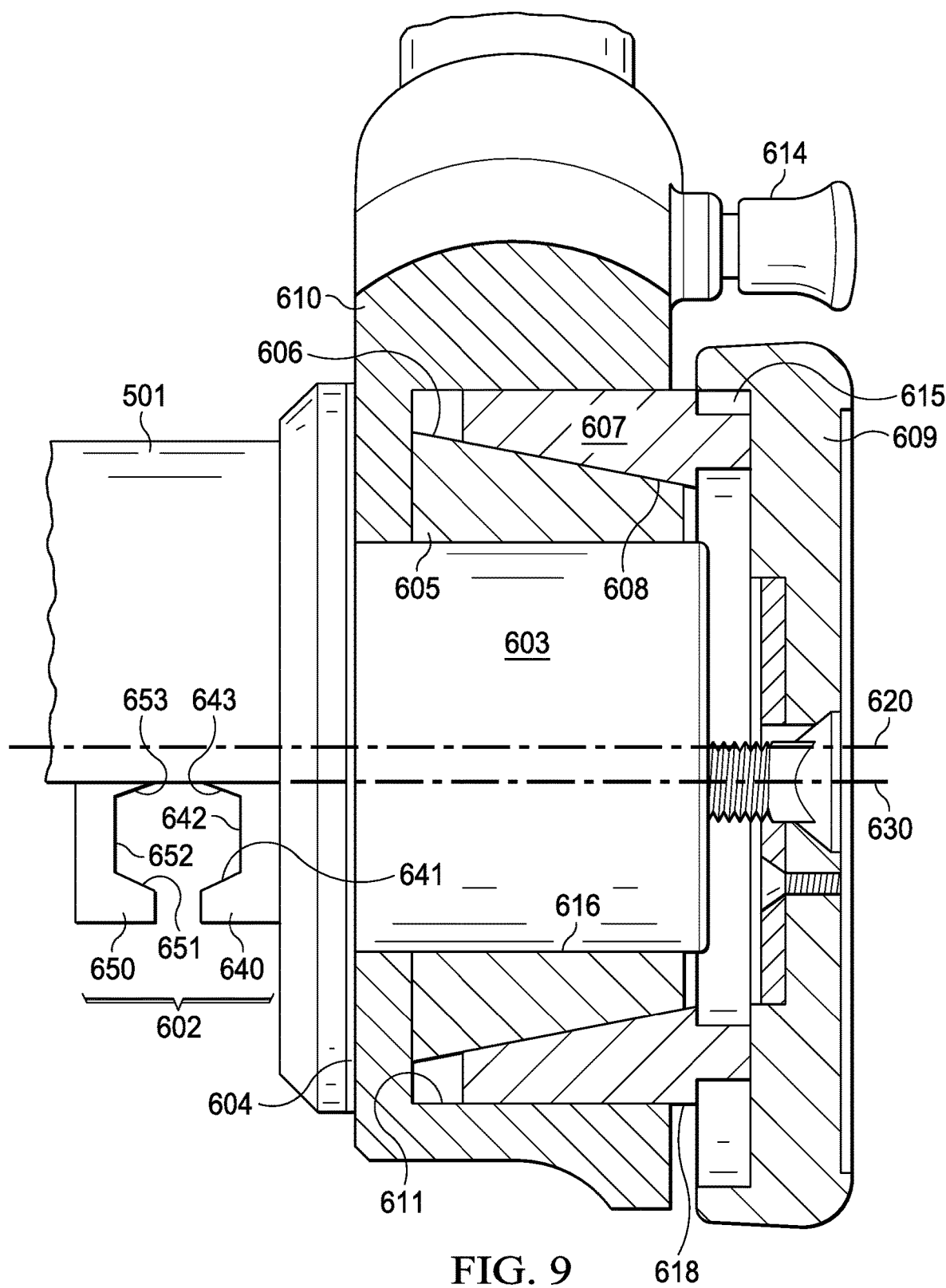
FIG. 9 shows a partial cross-section view of an example embodiment.

FIG. 5 shows a cross section view of an example embodiment of an assembly stroller handle section. The housing 417 contains a tapered collet 414 frictionally engaged to a tapered adaptor 413. The inner housing 417 is not tapered in this example embodiment. The tapered surface 456 of the adaptor 413 and the tapered surface 457 of the collet 414 provide the progressive friction as the collet is loaded against the adaptor. The force against the collet 414 is provided by the collet knob 415 coupled to the collet shaft 450 and held in place by fastener 454 threaded into bore 451. A retractable pin 455 is located in bore 452. Shaft 423 is located off-centered from the axis of rotation, which is about fastener 454. Locking tap 460 provides a method for locking the adaptor 413 from rotating with respect to the housing 417. Screws 453 couple the disk 459 into the collet knob 415.

FIG. 6-9 illustrate an alternative embodiment stroller handle apparatus. In this embodiment the apparatus mounts to a stroller with a mounting bar 501 having a telescoping length adjustment to allow fitment to a range of stroller handle widths. The mounting bar 501 is mounted to the stroller by first and second clamps 502 and 602. These clamps are mounted near opposite ends of mounting bar 501. Typically the mounting bar will mount across portions of the stroller handle so clamps 502 and 602 can be adapted to clamp to bars that are perpendicular to mounting bar 501.

The clamps can each have a first jaw 540/640 with a central inner surface 542/642 perpendicular to axis of rotation 520/620 and angled inner surfaces 541/641, 543/643 at an angle between 5 and 85 degrees of central inner surface 542/642. The clamps can also each have a second jaw 550/650 with a central inner surface 552/652 perpendicular to axis of rotation 520/620 and angled inner surfaces 551/651, 553/653 at an angle between 5 and 85 degrees of central inner surface 552/652. Such an arrangement allows for secure clamping to a variety of stroller handle diameters and cross-sections (round, oval, square, etc.). The clamps can be actuated by any suitable mechanism, including cam-locks, screw threads, and ratchets.

Continuing with the examples of FIG. 6-9, each side of the apparatus has a resistance system attached to the end of mounting bar 501. The resistance system on one side will typically be the mirror image of that on the other side. In this example, the first side's resistance system includes a first rotational resistance body 503 mounted to the first end of the mounting bar. This first rotational resistance body 503 is substantially cylindrical about a rotational axis 520. This rotational axis 520 is the axis about which the handle 512 rotates and about which resistance is generated. The resistance mechanism has a first inner collet 505 with a conical outer surface 506 and cylindrical inner surface 516 about the rotational axis 520. The resistance system also has a first outer collet 507 with a conical inner surface 508 about the rotational axis 520 fitting against the outer surface 506 of the first inner collet 505. This allows axial displacement and/or force between the inner and outer collets along the rotational axis 520 to vary the rotational resistance between these components. A first tension knob 509 is threaded into the first rotational housing along an adjustment axis 530 parallel to but offset from the rotational axis 520. This allows rotation of the first tension knob 509 to adjust frictional forces between the first inner collet 505 and first outer collet 507. Offsetting this threaded axis from the axis or rotation also allows for the use of a larger diameter adjustment knob, reducing the relative force necessary to achieve resistance adjustments. A first handle housing 510 has a substantially cylindrical inner surface 511 about the rotational axis 520 and can engage outer surface 518 of first outer collet 507. The first handle 512 engaged by the user is mounted at a first end to the first handle housing 510.

In this example, the second side's resistance system includes a second rotational resistance body 603 mounted to the second end of the mounting bar. This second rotational resistance body 603 is substantially cylindrical about a rotational axis 620. This rotational axis 620 is the axis about which the handle 612 rotates and about which resistance is generated. The resistance mechanism has a second inner collet 605 with a conical outer surface 606 and cylindrical inner surface 616 about the rotational axis 620. The resistance system also has a second outer collet 607 with a conical inner surface 608 about the rotational axis 620 fitting against the outer surface 606 of the second inner collet 605. This allows axial displacement and/or force between the inner and outer collets along the rotational axis 620 to vary the rotational resistance between these components. A second tension knob 609 is threaded into the first rotational housing along an adjustment axis 630 parallel to but offset from the rotational axis 620. This allows rotation of the second tension knob 609 to adjust frictional forces between the second inner collet 605 and second outer collet 607. Offsetting this threaded axis from the axis or rotation also allows for the use of a larger diameter adjustment knob, reducing the relative force necessary to achieve resistance adjustments. A second handle housing 610 has a substantially cylindrical inner surface 611 about the rotational axis 620 and can engage outer surface 618 of second outer collet 607. The second handle 612 engaged by the user is mounted at a first end to the second handle housing 610.

The rotation of the handle 512/612 about a rotational axis 520/620 can be resisted by friction between inner collet 505/605, outer collet 507/607, handle housing 510/610, and/or rotational resistance body 503/603. Rotational axis 520 and 620 can be the same, offset and parallel, or offset angularly.

The first and second rotational resistance bodies 503/603 can have a shoulder 504/604 abutting an inner end of the inner collet 505/605. This shoulder 504/604 provides a surface to resist axial movement of the inner collet inward.

The first and second handle housings can have a first and second handle socket 513 and 613 for receiving the first end of handles 512 and 612, respectively. These sockets can have associated detents 514/614 adapted to engage one or more sockets 515/615 on handles 512/612 to allow selective rotation of the handles in the handle sockets. The handles 512 and 612 can also be bent to allow an angular deflection either in or out of the plane in which the handle rotates. This can allow adjustment to suit an individual user's kinematics and/or comfort.

The outer collets 507/607 can have a circumferential outer groove 515/615 adapted to provide clearance between the outer circumference of the outer collet 507/607 and the tension knob 509/609.

The inner collets 505/605 can have a radial slot to allow the circumference of inner surface 516/616 to decrease under compressive load. This reduction of the circumference of inner surface 516/616 increases rotational friction between inner collet 505/605 and rotational resistance body 503/603.

The outer collets 507/607 can have a radial slot to allow the circumference of outer surface 518/618 to increase under expansive load. The increase of the circumference of outer surface 518/618 increases rotational friction between first outer collet 507/607 and first handle housing 510/610.

Although the invention has been described in terms of embodiments which are set forth in detail, it should be understood that this is by illustration only and that the invention is not necessarily limited thereto. For example, terms such as top and bottom could be left and right, respectively. The alternative embodiments and operating techniques will become apparent to those of ordinary skill in the art in view of the present disclosure. Also, different features from different described embodiments may be substituted and/or combined to achieve desired results. Accordingly, modifications of the invention are contemplated which may be made without departing from the spirit of the claimed invention.

What is claimed is:

1. A stroller handle assembly comprising:
a first handle assembly rotationally coupled to a first end of a shaft having a shaft axis, the first handle assembly further comprising a first cylindrical housing having a first axis with a first handle protruding tangentially therefrom, wherein the first handle rotates about the first axis and the first axis is offset from the shaft axis;
a second handle assembly rotationally coupled to a second end of the shaft, the second handle assembly further comprising a second cylindrical housing having a second axis with a second handle protruding tangentially therefrom, wherein the second handle rotates about the second axis and the second axis is offset from the shaft axis; and
wherein the stroller handle assembly is adapted to couple to an existing stroller handle.

2. The stroller handle assembly of claim 1 further comprising a first cylindrical collet with a cylindrical hollow opening disposed within a first cylindrical housing.

3. The stroller handle assembly of claim 2 further comprising a first adaptor disposed within the cylindrical hollow opening of the first cylindrical collet.

4. The stroller handle assembly of claim 3 further comprising a first collet shaft disposed within the first cylindrical housing and coupled to the first cylindrical housing and further coupled to the shaft.

5. The stroller handle assembly of claim 4 further comprising a first collet knob coupled to the first cylindrical collet, wherein the first collet knob threads into the first cylindrical housing and provides the compression on the first cylindrical collet, thereby controlling the rotational friction within the first handle assembly.

6. The stroller handle assembly of claim 4 wherein the first cylindrical collet is a tapered cylinder.

7. The stroller handle assembly of claim 4 wherein the first cylindrical collet has a tangential gap.

8. The stroller handle assembly of claim 4 wherein the first adaptor is a tapered cylinder.

9. The stroller handle assembly of claim 1 further comprising a second cylindrical collet with a cylindrical hollow opening disposed within a second cylindrical housing.

10. The stroller handle assembly of claim 9 further comprising a second adaptor disposed within the cylindrical hollow opening of the second cylindrical collet.

11. The stroller handle assembly of claim 10 further comprising a second collet shaft disposed within the second cylindrical housing and coupled to the second cylindrical housing and further coupled to the shaft.

12. The stroller handle assembly of claim 11 further comprising a second collet knob coupled to the second cylindrical collet, wherein the second collet knob threads into the second cylindrical housing and provides the compression on the second cylindrical collet, thereby controlling the rotational friction within the second handle assembly.

13. The stroller handle assembly of claim 11 wherein the second cylindrical collet is a tapered cylinder.

14. The stroller handle assembly of claim 11 wherein the second cylindrical collet has a tangential gap.

15. The stroller handle assembly of claim 11 wherein the second adaptor is a tapered cylinder.

16. The stroller handle assembly of claim 1 further comprising a first stroller clamp coupled to the shaft, proximate to the first handle assembly, wherein the first stroller clamp is adapted to couple to a stroller.

17. The stroller handle assembly of claim 16 wherein the first stroller clamp has a first jaw and a second jaw, each of the first and second jaw having three faces opposing those faces on the other jaw to describe a hexagonal shape between the jaws.

18. The stroller handle assembly of claim 1 further comprising a second stroller clamp coupled to the shaft, proximate to the second handle assembly, wherein the first stroller clamp is adapted to couple to a stroller.

19. The stroller handle assembly of claim 18 wherein the first stroller clamp has a first jaw and a second jaw, each of the first and second jaw having three faces opposing those faces on the other jaw to describe a hexagonal shape between the jaws.

20. A stroller handle apparatus comprising:
a mounting bar (501) having a telescoping length adjustment;
a first clamp (502) mounted proximate a first end of the mounting bar adapted to clamp to a bar perpendicular to the mounting bar;
a second clamp (602) mounted proximate a second end of the mounting bar adapted to clamp to a bar perpendicular to the mounting bar;
a first rotational resistance body (503) mounted to the first end of the mounting bar and being substantially cylindrical about a rotational axis (520);
a first inner collet (505) having a conical outer surface (506) and cylindrical inner surface (516) about the rotational axis;
a first outer collet (507) having a conical inner surface (508) about the rotational axis fitting against the outer surface (506) of the first inner collet (505);
a first tension knob (509) threaded into the first rotational housing along an adjustment axis (530) parallel to but offset from the rotational axis (520), wherein rotation of the first tension knob (509) adjusts frictional forces between the first inner collet (505) and first outer collet (507);
a first handle housing (510) having a substantially cylindrical inner surface (511) about the rotational axis (520);
a first handle (512) mounted at a first end to the first handle housing (510);
a second rotational resistance body (603) mounted to the second end of the mounting bar and being substantially cylindrical about a second rotational axis (620);
a second inner collet (605) having a conical outer surface (606) and cylindrical inner surface (616) about the second rotational axis;
a second outer collet (607) having a conical inner surface (608) about the second rotational axis fitting against the outer surface (606) of the second inner collet (605);
a second tension knob (609) threaded into the second rotational housing along a second adjustment axis (630) parallel to but offset from the second rotational axis (620) wherein rotation of the second tension knob (609) adjusts frictional forces between the second inner collet (605) and second outer collet (607);
a second handle housing (610) having a substantially cylindrical inner surface (611) about the second rotational axis (620); and
a second handle (612) mounted at a first end to the second handle housing (610).

21. The stroller handle apparatus of claim 20 wherein rotation of handle (512) about first rotational axis (520) is resisted by friction between inner collet (505), outer collet (507), and handle housing (510).

22. The stroller handle apparatus of claim 20 wherein rotation of handle (512) about first rotational axis (520) is resisted by friction between first inner collet (505), first outer collet (507), first handle housing (510), and first rotational resistance body (503).

23. The stroller handle apparatus of claim 20 wherein the first and second rotational axis are the same.

24. The stroller handle apparatus of claim 20 wherein the first rotational resistance body further comprises a shoulder (504) abutting an inner end of the first inner collet (505) and the second rotational resistance body further comprises a shoulder (604) abutting an inner end of the second inner collet (605).

25. The stroller handle apparatus of claim 20 wherein the first and second handle housing further comprise a first and second handle socket (513) and (613) for receiving the first end of handles (512) and (612), respectively.

26. The stroller handle apparatus of claim 20 further comprising a first detent (514) adapted to engage one or more sockets (515) on handle (512) to allow selective rotation of handle (512) in handle socket (513).

27. The stroller handle apparatus of claim 20 wherein first outer collet (507) further comprises a circumferential outer groove (515) adapted to provide clearance between the outer circumference of first outer collet (507) and first tension knob (509).

28. The stroller handle apparatus of claim 20 wherein first inner collet (505) further comprises a radial slot to allow the circumference of inner surface (516) to decrease under compressive load.

29. The stroller handle apparatus of claim 28 wherein the reduction of the circumference of inner surface (516) increases rotational friction between inner collet (505) and rotational resistance body (503).

30. The stroller handle apparatus of claim 20 wherein first outer collet (507) further comprises a radial slot to allow the circumference of outer surface (518) to increase under expansive load.

31. The stroller handle apparatus of claim 30 wherein the increase of the circumference of outer surface (518) increases rotational friction between first outer collet (507) and first handle housing (510).

32. The stroller handle apparatus of claim 20 wherein the first clamp (502) comprises:
a first jaw (540) having a central inner surface (542) perpendicular to axis of rotation (520) and angled inner surfaces (541), (543) at an angle between 5 and 85 degrees of central inner surface (542); and
a second jaw (550) having a central inner surface (552) perpendicular to axis of rotation (520) and angled inner surfaces (551), (553) at an angle between 5 and 85 degrees of central inner surface (552).

33. The stroller handle apparatus of claim 32 wherein first clamp (502) further comprises a cam lock for urging second jaw (550) toward first jaw (540).

34. The stroller handle apparatus of claim 32 wherein first clamp (502) further comprises a screw for urging second jaw (550) toward first jaw (540).

35. The stroller handle apparatus of claim 20 wherein the first handle housing's substantially cylindrical inner surface (511) engages the outer surface (518) of the first outer collet (507).

* * * * *